United States Patent
Petrosyan et al.

(10) Patent No.: US 11,784,387 B2
(45) Date of Patent: Oct. 10, 2023

(54) MULTI-AXIS WIND DEFLECTION RADOME

(71) Applicant: DISH Wireless L.L.C., Englewood, CO (US)

(72) Inventors: Garo Petrosyan, Lakewood, CO (US);
Stephen Bye, Littleton, CO (US);
Jennings Orcutt, Denver, CO (US);
Evan Tedesco, Highlands Ranch, CO (US)

(73) Assignee: DISH Wireless L.L.C., Littleton, CO (US)

( * ) Notice: Subject to any disclaimer, the term of this patent is extended or adjusted under 35 U.S.C. 154(b) by 127 days.

(21) Appl. No.: 17/524,052

(22) Filed: Nov. 11, 2021

(65) Prior Publication Data
US 2022/0149503 A1      May 12, 2022

Related U.S. Application Data

(60) Provisional application No. 63/112,746, filed on Nov. 12, 2020.

(51) Int. Cl.
| | | |
|---|---|---|
| *H01Q 1/00* | (2006.01) | |
| *H04W 88/08* | (2009.01) | |
| *H01Q 1/12* | (2006.01) | |
| *H01Q 1/42* | (2006.01) | |
| *H01Q 1/24* | (2006.01) | |

(52) U.S. Cl.
CPC .......... *H01Q 1/005* (2013.01); *H01Q 1/1242* (2013.01); *H01Q 1/246* (2013.01); *H01Q 1/421* (2013.01); *H01Q 1/428* (2013.01); *H04W 88/08* (2013.01)

(58) Field of Classification Search
CPC ...... H01Q 1/1242; H01Q 1/246; H01Q 1/428; H01Q 1/005; H01Q 1/421; H01Q 9/34
See application file for complete search history.

(56) References Cited

U.S. PATENT DOCUMENTS

| | | |
|---|---|---|
| 7,460,080 B1 | 12/2008 | Watson, III |
| 7,891,939 B1 | 2/2011 | Zuteck |
| 2004/0086340 A1 | 5/2004 | Steinkamp et al. |
| 2007/0229375 A1 | 10/2007 | Cislo |
| 2007/0253208 A1 | 11/2007 | Howard et al. |

(Continued)

OTHER PUBLICATIONS

Wikipedia, Kammback, https://en.wikipedia.org/wiki/Kammback (Year: 2015), 5 pages.

*Primary Examiner* — Awat M Salih
(74) *Attorney, Agent, or Firm* — Kilpatrick Townsend & Stockton LLP

(57) ABSTRACT

Embodiments provide tower-mountable base station antenna enclosure systems to reduce effective wind loads of housed antenna components. The enclosure systems can include wind deflection radomes sized to house antenna components and mountable to tower structures by rotatable couplings. For example, embodiments can have a rotational axis that is substantially transverse to primary wind directions, and the wind deflection structures can be mounted in a manner that permits substantially free rotation around the axis. Such enclosure systems can reduce the wind load of the antenna as deployed on a tower, such that a smaller marginal structural impact can be attributed to deployed antenna components, and the antenna components can be considered as smaller structural loads on the tower.

19 Claims, 12 Drawing Sheets

(56) References Cited

U.S. PATENT DOCUMENTS

| | | |
|---|---|---|
| 2009/0223164 A1* | 9/2009 | Cook .................... H01Q 1/005 |
| | | 52/651.07 |
| 2015/0057047 A1* | 2/2015 | Hendrix .................. H04B 1/40 |
| | | 455/562.1 |
| 2016/0248151 A1 | 8/2016 | Proshold et al. |
| 2016/0329633 A1 | 11/2016 | Hendrix et al. |
| 2016/0329641 A1 | 11/2016 | Lee et al. |
| 2018/0026327 A1 | 1/2018 | Hendrix et al. |
| 2018/0108978 A1* | 4/2018 | Gonsowski .............. H01Q 1/42 |
| 2020/0040870 A1* | 2/2020 | Monto ................... F03D 3/005 |
| 2020/0182451 A1 | 6/2020 | Girouard et al. |
| 2021/0050660 A1* | 2/2021 | Anderson ................ H01Q 3/04 |
| 2021/0313665 A1* | 10/2021 | Hoganson ............. H01Q 1/002 |
| 2022/0285826 A1 | 9/2022 | Ruiz |

\* cited by examiner

MULTI-AXIS WIND DEFLECTION RADOME

CROSS-REFERENCES

This application claims priority to U.S. Provisional Patent Application No. 63/112,746, filed on Nov. 12, 2020, entitled "Wind Deflection Radome." This application is also related to U.S. patent application Ser. No. 17/183,240, filed on Feb. 23, 2021, entitled "Cellular Antenna Enclosures." The disclosures of the above-identified patent applications are hereby incorporated by reference in their entirety for all purposes.

FIELD

This disclosure relates to tower-mounted antenna structures, such as multi-axis wind deflection radome structures for tower-mounted cellular and other radiofrequency antennas.

BACKGROUND

Long-range wireless communications, such as cellular communications, are facilitated by geographically distributed deployment of a large number of antennas. Typically, it is desirable for such antennas to be mounted in an elevated position, such as by mounting the antennas on tall towers. These towers can generally include dedicated structures, such as radio towers and radio masts; existing structures, such as water towers and building roofs; and/or any suitable structure to provide a sufficiently high mounting location for an antenna. With increasing demands on network capacity, changing network technologies, and other advancements in communications, such towers have become ubiquitous.

When deploying a new antenna, a communications services provider typically purchases mounting space on a tower from a tower provider. The communications services provider typically desires to deploy the antenna with particular characteristics, such as at a particular "RAD" height (corresponding to a center of radiation for the antenna), azimuth, elevation, etc. However, the ability of the tower to satisfy those characteristics and other purchase terms (e.g., where the mounting is permitted, how much it will cost, etc.) can be affected by the structural constraints of the tower.

One such constraint is that each tower has only a certain amount of usable space for mounting antennas, and the desired mounting heights of most antenna deployments further limits the usable area of any tower. Another such constraint is that each tower can only support a certain amount of weight. For example, large numbers of antennas and their associated cables, mounting hardware, and other components can place large structural loads on a tower. These and other constraints can be exacerbated by the typical desire to mount antenna deployments high up on the tower. Such high mounting can further limit the usable area of the tower, can put further structural load on the tower (e.g., the large moment arm increases the moment associated with each antenna load), and can intensify impacts of wind and weather on the tower.

SUMMARY

Embodiments of the present invention relate to Embodiments provide tower-mountable base station antenna enclosure systems to reduce effective wind loads of housed antenna components. The enclosure systems can include wind deflection radomes sized to house antenna components and mountable to tower structures by rotatable couplings. For example, embodiments can have a rotational axis that is substantially transverse to primary wind directions, and the wind deflection structures can be mounted in a manner that permits substantially free rotation around the axis. Such enclosure systems can reduce the wind load of the antenna as deployed on a tower, such that a smaller marginal structural impact can be attributed to deployed antenna components, and the antenna components can be considered as smaller structural loads on the tower.

According to one set of embodiments, a tower-mountable base station antenna enclosure system is provided. The system includes a radome and a rotatable coupling. The radome has an inner geometry that defines a cavity for housing a base station antenna, and an outer geometry having multiple wind deflection structures that define multiple wind alignment directions. The rotatable coupling attaches the radome to a tower support structure to permit the radome to rotate around a rotation axis in response to a wind force along a prevailing wind vector to point the radome along whichever of the wind alignment directions is closest to the prevailing wind vector. The rotation axis is defined by the rotatable coupling and orthogonal to the plurality of wind alignment directions. In some such embodiments, the rotatable coupling allows the radome to rotate an unlimited amount clockwise and counterclockwise around the rotation axis. In some such embodiments, the rotatable coupling includes a fixed structure to provide a fixed coupling between the base station antenna and the tower support structure, and a rotating attachment to rotatably couple the fixed structure with the radome.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Long-range wireless communications networks, such as cellular networks, satellite networks, and the like, typically include a large number of antennas that are mounted at high elevations on geographically distributed towers. As used herein, the term "tower" is intended broadly to describe any suitable dedicated structures, such as radio towers and radio masts; suitable non-dedicated structures, such as water towers and building roofs; and/or any other suitable structures that can provide a sufficiently high and secure mounting location for an antenna. When deploying a new antenna, a communications services provider typically desires to deploy the antenna with particular characteristics, such as at a particular "RAD" height (corresponding to a center of radiation for the antenna), azimuth, elevation, etc.

However, structural constraints of the tower can impact limit the ability of the tower to satisfy those and/or other characteristics. One such constraint is that each tower has only a certain amount of usable space for mounting antennas, and the desired mounting heights of most antenna deployments further limits the usable area of any tower. Another such constraint is that each tower can only support a certain amount of structural load. For example, large numbers of antennas and their associated cables, mounting hardware, and other components can weigh a considerable amount, particularly in aggregate, which can place large structural loads on a tower. These and other constraints can be exacerbated by the typical desire to mount antenna deployments high up on the tower, such as to maximize line of sight. This desire for elevated mounting of hardware effectively limits the usable area of the tower, can put further structural load on the tower, and can intensify impacts of wind and weather on the tower.

Figure 1:
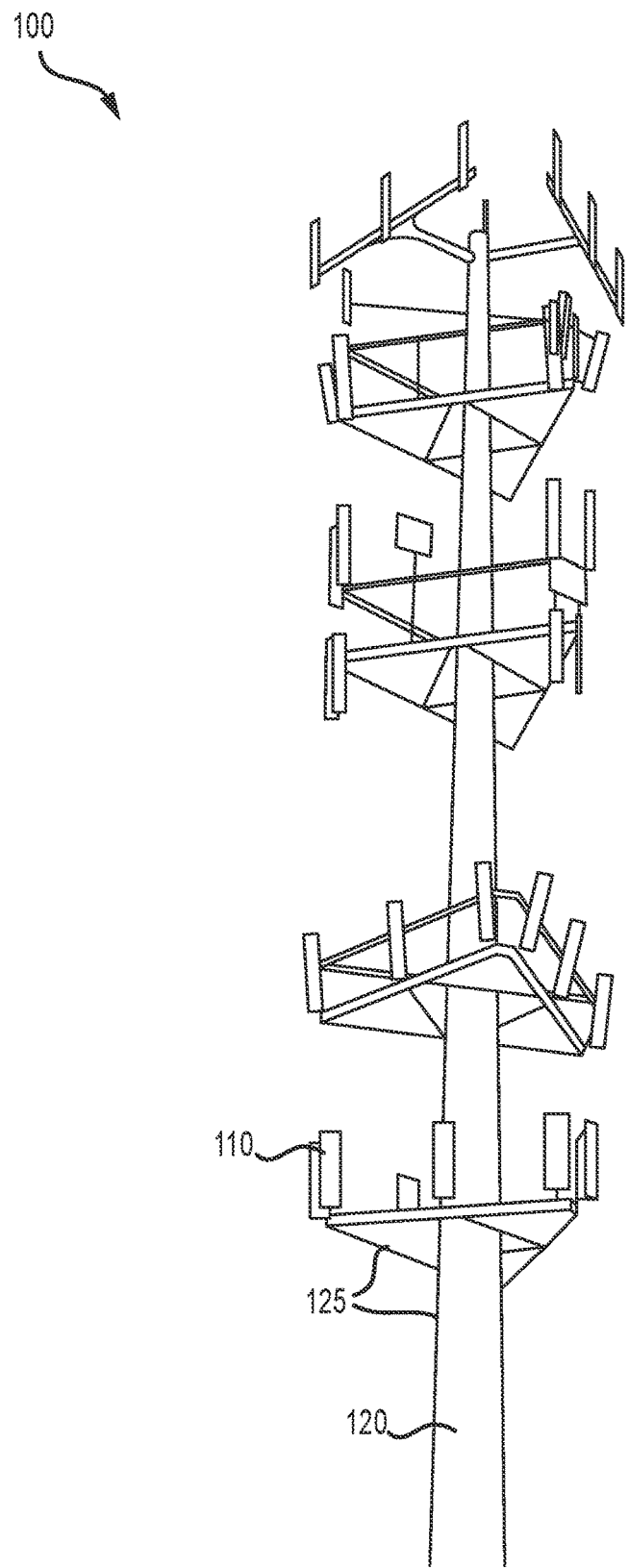
FIG. 1 shows an example of a conventional cellular communications tower with a large number of antennas mounted on a tower structure.

For example, FIG. 1 shows an example of a conventional cellular communications tower 100 with a large number of antennas 110 mounted on a tower structure 120. It can be seen that additional auxiliary structures 125 are often built onto the tower structure 120 to increase the number and types of mounting locations, to provide decks and ladders for service personnel, and/or for other reasons. All of these elevated structural loads place a large structural burden on the tower structure 120, which effectively reduces the amount of tower structure 120 real estate that is usable for additional antenna 110 deployments. Conventionally, these concerns tend to be addressed by building larger tower structures 120, stronger tower structures 120, and/or larger numbers of tower structures 120 and/or seeking to reduce the weight of the antenna 110 deployments.

Embodiments described herein provide wind deflection radomes for installing around tower-mounted antennas (e.g., like the antennas 110 shown in FIG. 1). The inventors have recognized that, while the structural load associated with an antenna conventionally tends to be attributed to its weight, the wind load of the antenna can also have an appreciable impact on its effective structural impact to the tower. For example, a wind load for a particular antenna deployment with respect to a tower can be a function of various factors, such as projected area consumed by the antenna (A), expected wind pressure on the antenna (P), drag coefficient of the antenna (Cd), exposure coefficient of the antenna (Kz), and gust response factor of the antenna (Gh). Kz can be calculated by taking into account the height from the ground to the midpoint of the antenna when installed on the tower (e.g., in feet). Gh can be calculated by taking into account the entire height of the object in 1/feet ($ft^{-1}$). The wind load (F) can be generally described as a product of these factors (e.g., $F=A \times P \times Cd \times Kz \times Gh$). For example, depending on the units, environmental factors, etc.; this may be a weighted product (e.g., with multipliers in front of some or all of the factors). In some cases, more or fewer factors are considered. In some cases, modeling is used to develop more nuanced sets of factors and/or relationships between the factors.

Thus, when deploying an antenna at a high elevation on a tower structure, the mass load of the antenna (including all its mounting structures, cables, etc.) at such a large moment arm and the wind load (which tends to increase at higher elevations) can both appreciably contribute to the antenna's effective structural load on the tower. While conventional approaches tend to focus on strengthening the tower, limiting the number of deployments on the tower, reducing the mass of the antennas, and/or the like, embodiments herein seek to reduce the wind load.

As described herein, embodiments include tower-mountable base station antenna enclosure systems. The systems include a radome that houses one or more antennas, and a rotatable coupling to couple the radome to a tower in a manner that permits the radome to freely rotate. The radome is structurally configured so that the radome will tend to rotate (via the rotatable coupling) into an alignment that accords with a prevailing wind direction and to provide wind deflection when in that alignment. For example, embodiments can have a rotational axis that is substantially transverse to prevailing wind directions, and the wind deflection structures are mounted in a manner that permits substantially free rotation around the axis in a clockwise and/or counter-clockwise fashion. The radome can effectively reduce the wind load of the antenna or antennas as deployed on the tower, such that a smaller marginal structural impact can be attributed to the antenna, and the antenna can be considered as a smaller load. As a result, each tower can potentially support more such antenna deployments, and/or each such antenna deployment can have a lower associated cost.

Figure 2A:
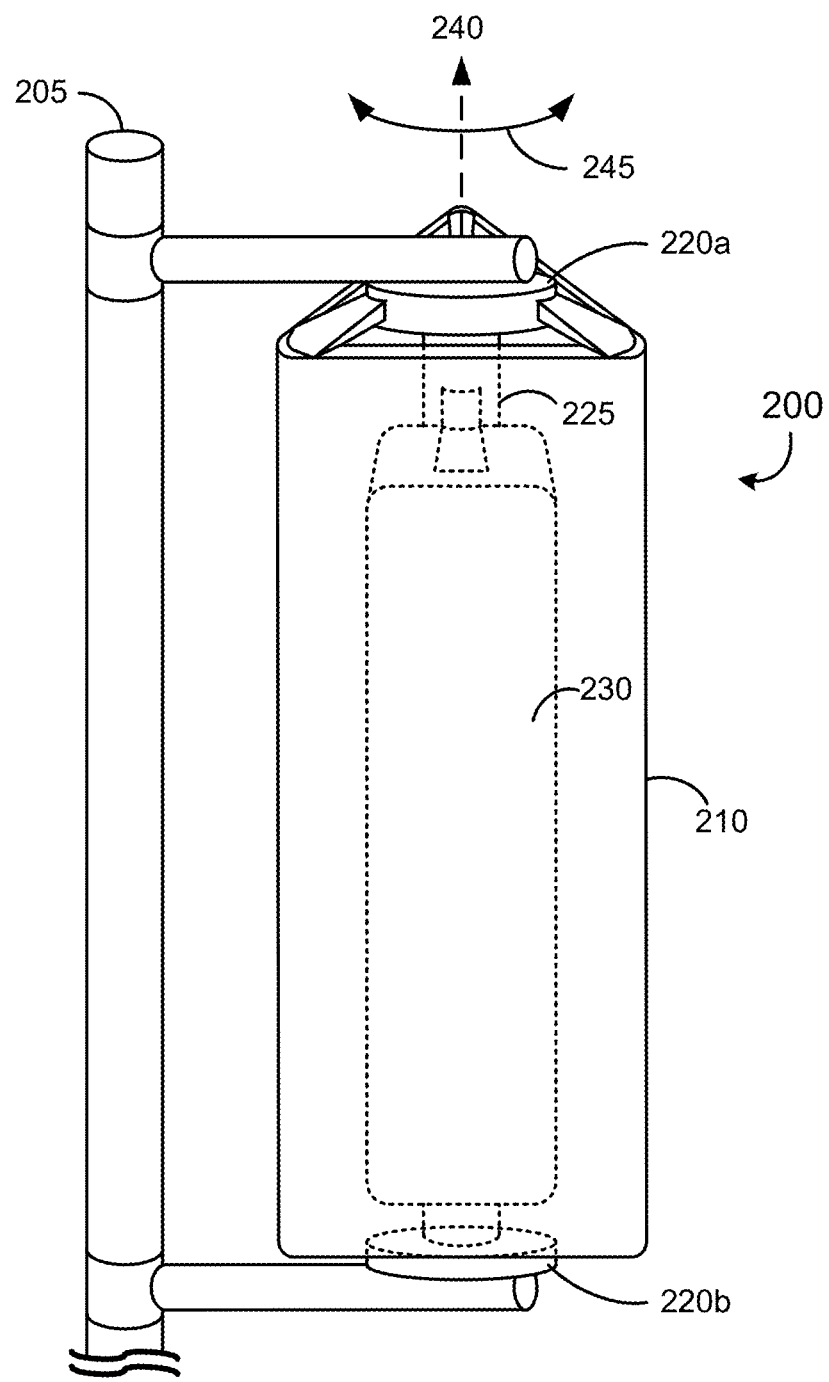
FIG. 2A shows an illustrative tower-mountable base station antenna enclosure system in context of deployment on a simplified tower support structure, according to various embodiments described herein.

FIG. 2A shows an illustrative tower-mountable base station antenna enclosure system 200 in context of deployment on a simplified tower support structure 205, according to various embodiments described herein. As shown, the enclosure system 200 includes a radome 210 and a rotatable coupling 220. As used herein, the term "radome" is intended generally to include any structure that at least partially surrounds an antenna without appreciably interfering with the transmission and/or reception properties of the antenna. In some embodiments, the radome 210 is made of materials and/or coatings that are sufficiently lightweight, while still have desirable physical properties for withstanding the deployment environment (e.g., sufficiently strong material, coatings that mitigate corrosion, etc.) and that have desirable electromagnetic properties (e.g., a low dielectric constant). For example, the radome 210 can be made of carbon fiber, Kevlar, and/or other synthetic fibers shown to have high performance structural and electromechanical properties.

The radome 210 is generally sized to be able to house one or more antenna components 230, such as one or more cellular antennas (e.g., for a 4G LTE or 5G NR cellular RAT network), one or more cellular radios, one or more radio access units (RAUs), and/or other cellular network components. As described herein, the shape of the radome 210 includes multiple wind deflection structures that define multiple wind alignment directions, so that the radome 210 deflects wind around housed antenna components 230 according to the multiple wind alignment directions. As described below, the radome 210 pivots around the housed antenna components 230. As such, an internal cavity of the radome 210 in which the antenna components 230 are housed is sized to be large enough to permit the radome 210 to freely pivot around those housed antenna components 230, supporting structures for those housed antenna components 230, wiring, and/or other related components. As described herein, embodiments of the radome 210 can include additional features. In some embodiments, the radome 210 includes one or more vents to permit airflow into the radome 210 and around the housed antenna components 230. In some embodiments (though not explicitly illustrated), the radome 210 includes dimples and/or other drag-reducing features.

The rotatable coupling 220 attaches the radome 210 to the tower support structure 205 to permit the radome 210 to rotate around a rotation axis 240 that is orthogonal to the wind alignment directions defined by the radome 210 structure. In some implementations, the rotatable coupling 220 includes an upper rotatable coupling 220a and a lower rotatable coupling 220b to support the radome 210 from the top and bottom. In other implementations, the rotatable coupling 220 includes only an upper rotatable coupling 220a, such that the radome 210 is effectively suspended by the rotatable coupling 220. In other implementations, the rotatable coupling 220 includes only a lower rotatable coupling 220b, such that the radome 210 is supported only from underneath. In some implementations, the upper rotatable coupling 220a and/or the lower rotatable coupling 220b are coupled with a central pivot structure 225 (e.g., a pole or some other form of support), and the rotatable coupling 220 permits the radome 210 to pivot around the central structure 225. For example, a low-friction bearing assembly or some other form of rotatable coupling 220 may be used to attach the radome 210 to the central structure 225. In other embodiments, magnetic and/or electromagnetic levitation is used to help reduce rotational friction. In some implementations, there can be multiple axes of rotation.

Embodiments of the rotatable coupling 220 permit the radome 210 to rotate an unlimited amount both clockwise and counterclockwise around the rotation axis 240 (as illustrated by bidirectional arrow 245) in response to a wind force in a prevailing wind direction. The radome 210 geometry defines multiple potential wind alignment directions, and the rotatable coupling 220 allows the radome 210 to be pointed by the wind force (by rotating, pivoting, etc.) along whichever of the wind alignment directions is closest to the prevailing wind direction. As the radome 210 turns to align with the wind, the antenna components 230 can remain in a fixed rotational position. For example, rotatable coupling 220 includes a fixed attachment to the tower support structure 205, a fixed attachment to the central structure 225, and a rotatable attachment to the radome 210; and the antenna components 230 are mounted by a fixed attachment to the central structure 225. As such, the antenna components 230 are coupled with the tower support structure 205 via a fixed attachment to the central structure, which has a fixed attachment to the rotatable coupling 220, which has a fixed attachment to the tower support structure 205; while the rotatable portion of the rotatable coupling 220 permits the radome 210 to rotate around the fixed position of the antenna components 230.

As noted above, embodiments of the radome 210 house one or more antenna components 230. For example, in a tower deployment with many antennas, a separate enclosure system 200 can house each individual antenna, each enclosure system 200 can house multiple antennas, etc. Embodiments of the rotatable coupling 220 can be configured to accommodate any cabling to the antenna components 230. For example, any rotating components (e.g., bearings) can be designed to rotate around cabling without interfering with the cabling. In some embodiments, the cabling is routed within the central structure 225, or other suitable structure.

Figure 2B:
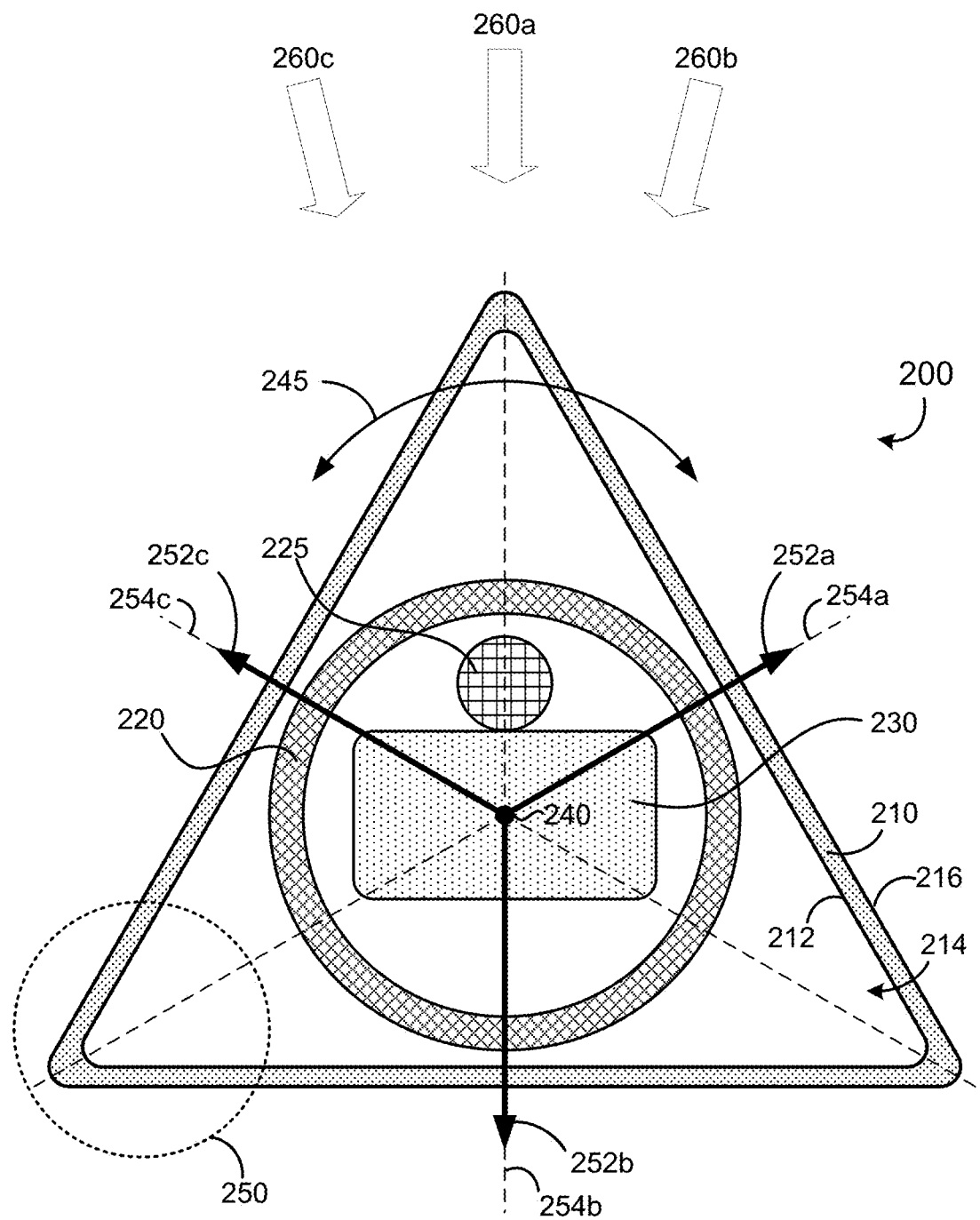
FIG. 2B shows an example of a cross-sectional view of the illustrative tower-mountable base station antenna enclosure system of FIG. 2A.

FIG. 2B shows an example of a cross-sectional view of the illustrative tower-mountable base station antenna enclosure system 200 of FIG. 2A. The cross-sectional view represents a cross-section of the enclosure system 200 cut along a plane orthogonal to the rotation axis 240. The cross-sectional view shows the radome 210, the rotatable coupling 220, and the antenna components 230. The radome 210 has an inner geometry 212 and an outer geometry 216. The inner geometry 212 defines a cavity 214 sized for housing the antenna components 230 and any auxiliary components, such as a central structure 225 of the rotatable coupling 220 to which the antenna components 230 can be in fixed attachment. In particular, the cavity 214 is sized to permit the radome 210 to rotate an unlimited amount clockwise and counterclockwise around the rotation axis 240 (as illustrated by bidirectional arrow 245).

Various embodiments of radomes 210 are described herein having various outer geometries 216. In each embodiment, as described above, the outer geometry 216 of the radome 210 includes multiple wind deflection structures 250 that define multiple wind alignment directions 252. For example, in the embodiment of FIGS. 2A and 2B, the outer geometry 216 follows a rounded triangle shape with three vertices. Each of the three vertices forms one of the wind deflection structures 250, so that the outer geometry 216 defines three wind alignment directions 252 corresponding to the three vertices of the rounded triangle. The outer geometries 216 of embodiments of the radome 210 can also include at least two lines of symmetry 254, such that each of the wind alignment directions 252 is collinear with one of the lines of symmetry 254. For example, in the embodiment of FIGS. 2A and 2B, the rounded triangle shape of the outer geometry 216 has three lines of symmetry 254 (corresponding to the three vertices), and each of the three wind alignment directions 252 is collinear with one of the three lines of symmetry 254.

For example, example prevalent wind vectors 260 are shown, each defining at least a primary direction of wind force on the radome 210 at any particular time. As used in this context, references to directions is intended to refer to the components of those directions lying in a plane orthogonal to the rotation axis. Each prevalent wind vector can be a sum of all the vectors (i.e., magnitudes and directions) of all wind interacting with the radome 210 at a particular moment. The illustrated orientation of the radome 210 can be considered as already in general alignment wind blowing according to prevalent wind vector 260a. In that orientation, the radome 210 is rotated to substantially align wind alignment direction 252b in the direction of prevalent wind vector 260a. If the primary direction of the wind changes to correspond to prevalent wind vector 260b or 260c, the radome 210 may rotate via the rotatable coupling 220 to maintain alignment between wind alignment direction 252b and the direction of prevalent wind vector 260b or 260c. If there is a relatively large and rapid change of primary wind direction to correspond to prevalent wind vector 260d, the radome 210 may rotate via the rotatable coupling 220 to align wind alignment direction 252c with the direction of prevalent wind vector 260d. For example, the illustrated radome 210 can realign to any sudden change of primary wind direction with a maximum clockwise or counter-clockwise rotation of 60 degrees.

Geometric terms are used herein to provide general geometric definition to the various radome 210 embodiments, and those terms are not intended to be construed precisely. For example, while the outer geometry 216 shown in FIG. 2B is illustrated as a rounded equilateral triangle with three equal sides and three lines of precise symmetry. However, such embodiments are intended further to include practical deviations due to manufacturing constraints, cost constraints, addition of other features (e.g., vents, dimples, etc.), etc. that still manifest similar operation. For example, a precise implementation of the illustrated enclosure system 200 can effectively respond equivalently in any of three wind alignment directions 252 that are maximally rotationally separated (i.e., each pointing 120 degrees away from its adjacent wind alignment directions 252). However, such embodiments are intended generally to include any three-sided outer geometry 216 that manifests similar responsiveness in any of three, rotationally separated wind alignment directions 252. For example, a practical implementation of the enclosure system 200 of FIG. 2B may have an outer geometry 216 with sides of slightly different lengths, so that the wind alignment directions 252 are rotationally separated by close to, but not precisely 120 degrees; and the "lines of symmetry 254" define an approximate symmetry, but not a precise symmetry. Still, however, the radome 210 would be generally recognized by one of skill in the art as having an outer geometry 216 that "follows a rounded triangle shape" in accordance with the above description. Similar construction is intended to be applied to other outer geometry 216 embodiments described herein. For example, reference to particular shapes, symmetry, etc. is intended to provide general geometric guidance as to the type of shape that can be used to implement the wind deflection features described herein.

Figure 2C:
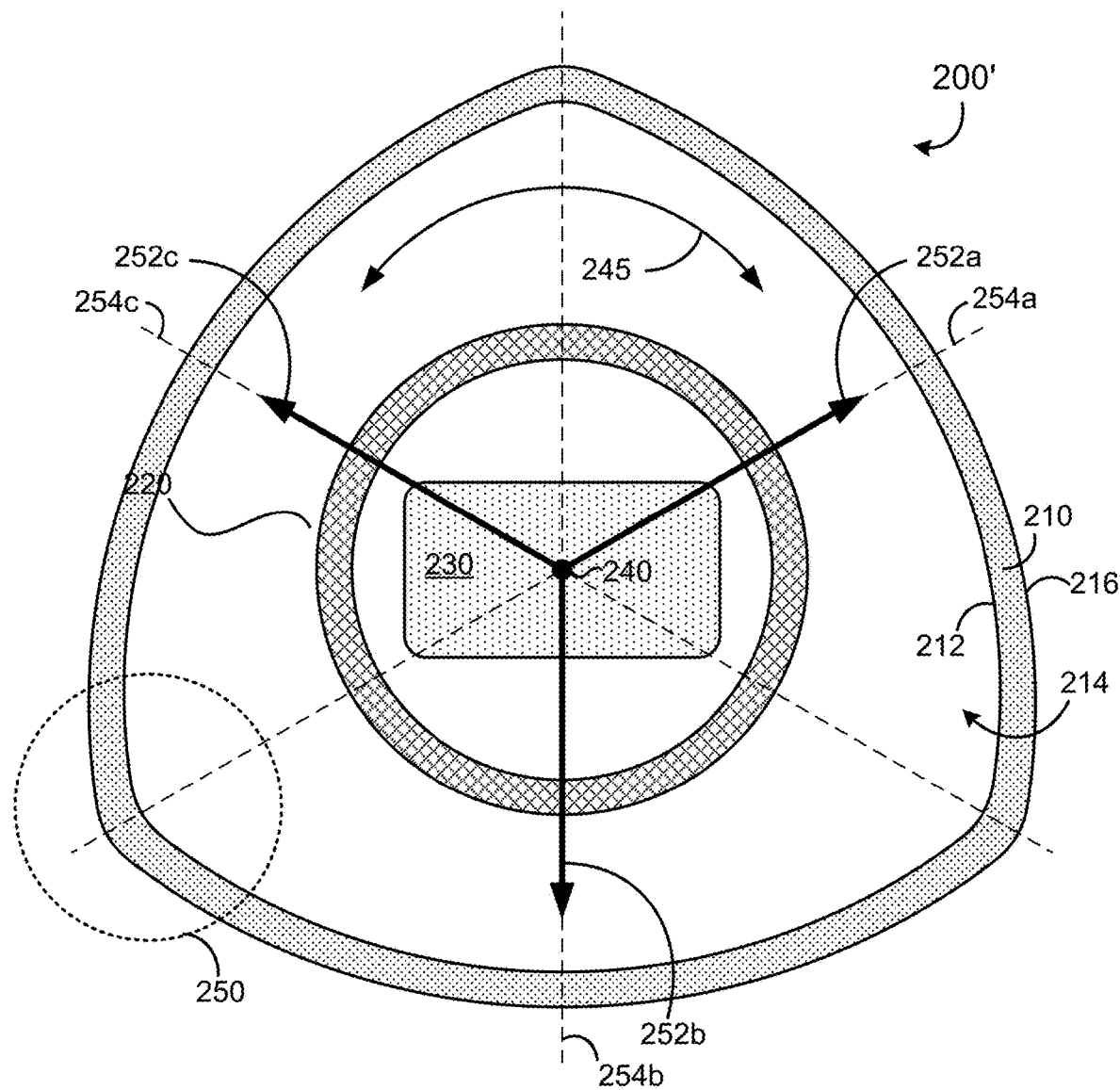
FIG. 2C shows an example cross-sectional view of an illustrative variant of the tower-mountable base station antenna enclosure system of FIGS. 2A and 2B.

FIG. 2C shows an example cross-sectional view of an illustrative variant of the tower-mountable base station antenna enclosure system 200 of FIGS. 2A and 2B (indicated as enclosure system 200'). As in FIG. 2B, the cross-sectional view represents a cross-section of the enclosure system 200 of FIG. 2A cut along a plane orthogonal to the rotation axis 240. The cross-sectional view of FIG. 2C shows the same components as shown in FIG. 2B with the same reference designators. However, the radome 210 in FIG. 2C is configured with an outer geometry 216 (and an inner geometry 212, in the illustrated embodiment) that is a variation of the outer geometry 216 shown in FIG. 2B. In particular, rather than having substantially flat sides as in FIG. 2B, the rounded triangular shape of the outer geometry 216 in FIG. 2C has curved sides. For example, the shape can be similar to a Reuleaux triangle. While the sides are shown as curving outward (i.e., creating substantially convex sides to the outer geometry 216), other implementations can curve one or more sides inward (i.e., creating substantially concave sides to the outer geometry 216).

It can be seen that operation of enclosure system 200' is substantially the same as that of enclosure system 200. For example, the outer geometry 216 in FIG. 2C similarly has three vertices, each forming one of three wind deflection structures 250, thereby defining three wind alignment directions 252 (collinear with corresponding lines of symmetry 254). As a primary direction of the wind changes, the radome 210 can rotate via the rotatable coupling 220 to maintain alignment between the present prevalent wind direction and whichever of the wind alignment directions 252 is closest to that present prevalent wind direction. Different implementations of the enclosure system 200' can have different amounts of rounding of the sides and/or at the vertices, based on a balance of wind responsiveness factors. For example, more rounding at the corners and/or sides can tend to reduce certain types of turbulence caused by interactions between the wind and the geometry (e.g., eddy currents, etc.). On the other hand, excessive rounding can tend to reduce the ability of the geometry to translate a lateral wind force into a rotational force by which to maintain alignment of the radome 210 to the wind direction.

Figure 3A:
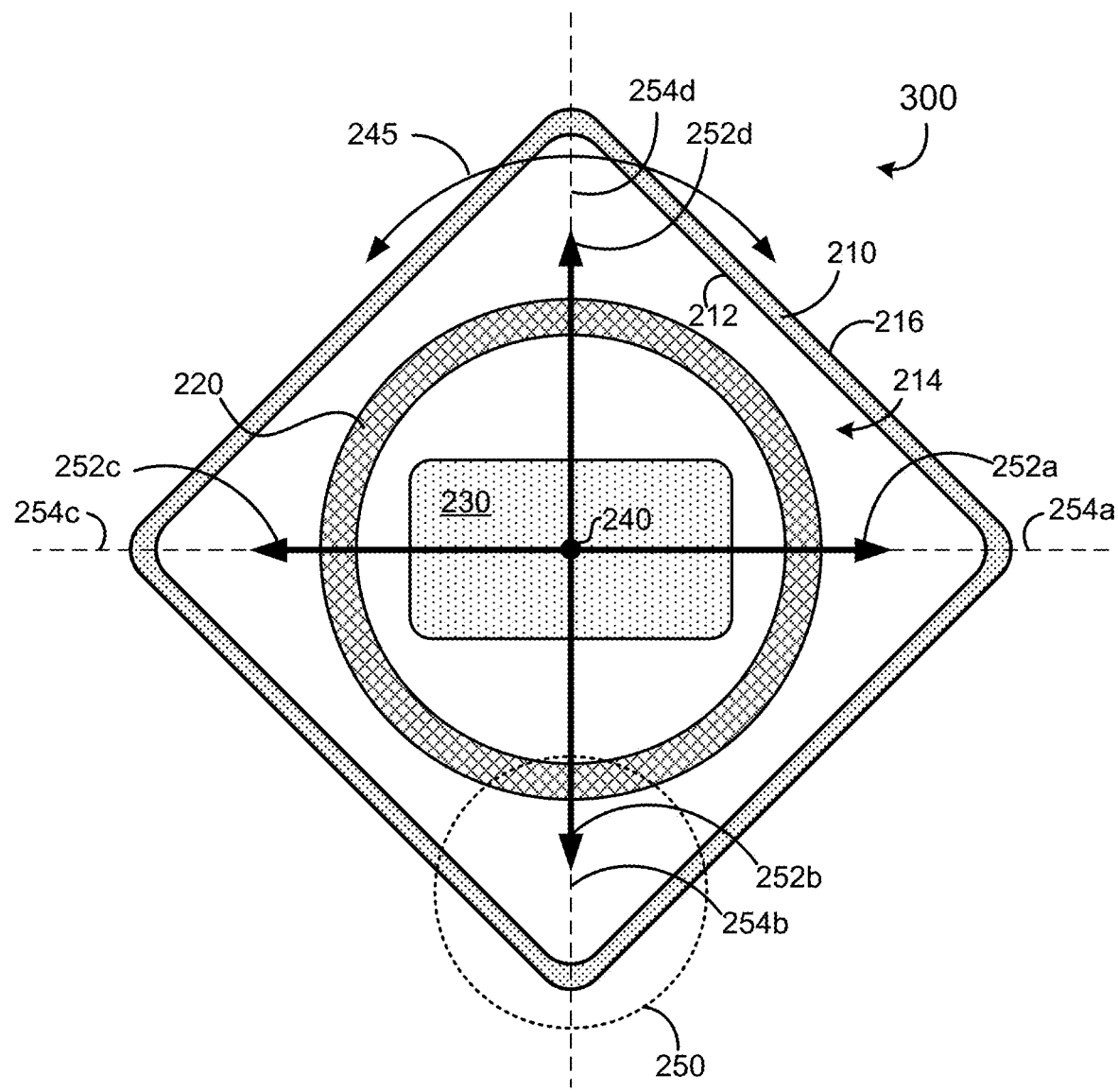
FIG. 3A shows an example cross-sectional view of another illustrative tower-mountable base station antenna enclosure system having an outer geometry that follows a rounded quadrilateral shape, according to various embodiments.

FIG. 3A shows an example cross-sectional view of another illustrative tower-mountable base station antenna enclosure system 300 having an outer geometry 216 that follows a rounded quadrilateral shape, according to various embodiments. As in preceding embodiments, the enclosure system 300 can rotate in an unlimited fashion around a rotation axis 240 in a clockwise and/or counter-clockwise direction (as indicated by bidirectional arrow 245). The cross-section is cut along a plane orthogonal to the rotation axis 240. In some embodiments, the cross-sectional view can represents a cross-section of a constant cross-section shape, such as cross-section through a lateral surface of a rectangular prism. The cross-sectional view shows the same components as shown in preceding figures with the same reference designators.

Unlike the embodiments of FIGS. 2A-2C, the radome 210 in FIG. 3A is configured with an outer geometry 216 (and an inner geometry 212, in the illustrated embodiment) that follows a rounded quadrilateral. The rounded quadrilateral shape defines four wind alignment directions corresponding to four vertices of the rounded quadrilateral. In some implementations, as illustrated, the outer geometry 216 follows a rounded square shape. In other implementations, the outer geometry 216 follows a rectangular shape other than a square. In other implementations, the outer geometry 216 follows a parallelogram, rhombus, diamond, and/or other four-sided shape. While the illustrated outer geometry 216 includes exactly four sides and vertices, other embodiments of the outer geometry 216 can follow a rounded regular polygon of N vertices that defines N wind alignment directions corresponding to the N vertices of the rounded regular polygon (N is an integer greater than 2). For example, FIGS. 2B and 2C show examples where N=3, and FIG. 3 shows an example where N=4. Other shapes, such as pentagons (i.e., N=5), hexagons (i.e., N=6), octagons (i.e., N=8), etc. can be used. The polygonal shapes can be regular or irregular polygon shapes. Any number of sides, vertices, etc. can be used, as long as other constraints of the radome 210 are met. For example, as described above, the inner geometry 212 defines a cavity 214 large enough to house one or more antenna components 230 (and supporting structures and components) in a fixed location regardless of the present rotational orientation of the radome 210, and the wind deflection structures 250 of the outer geometry 216 cause the radome 210 to rotate according to corresponding wind alignment vectors responsive to wind forces.

Figure 3B:
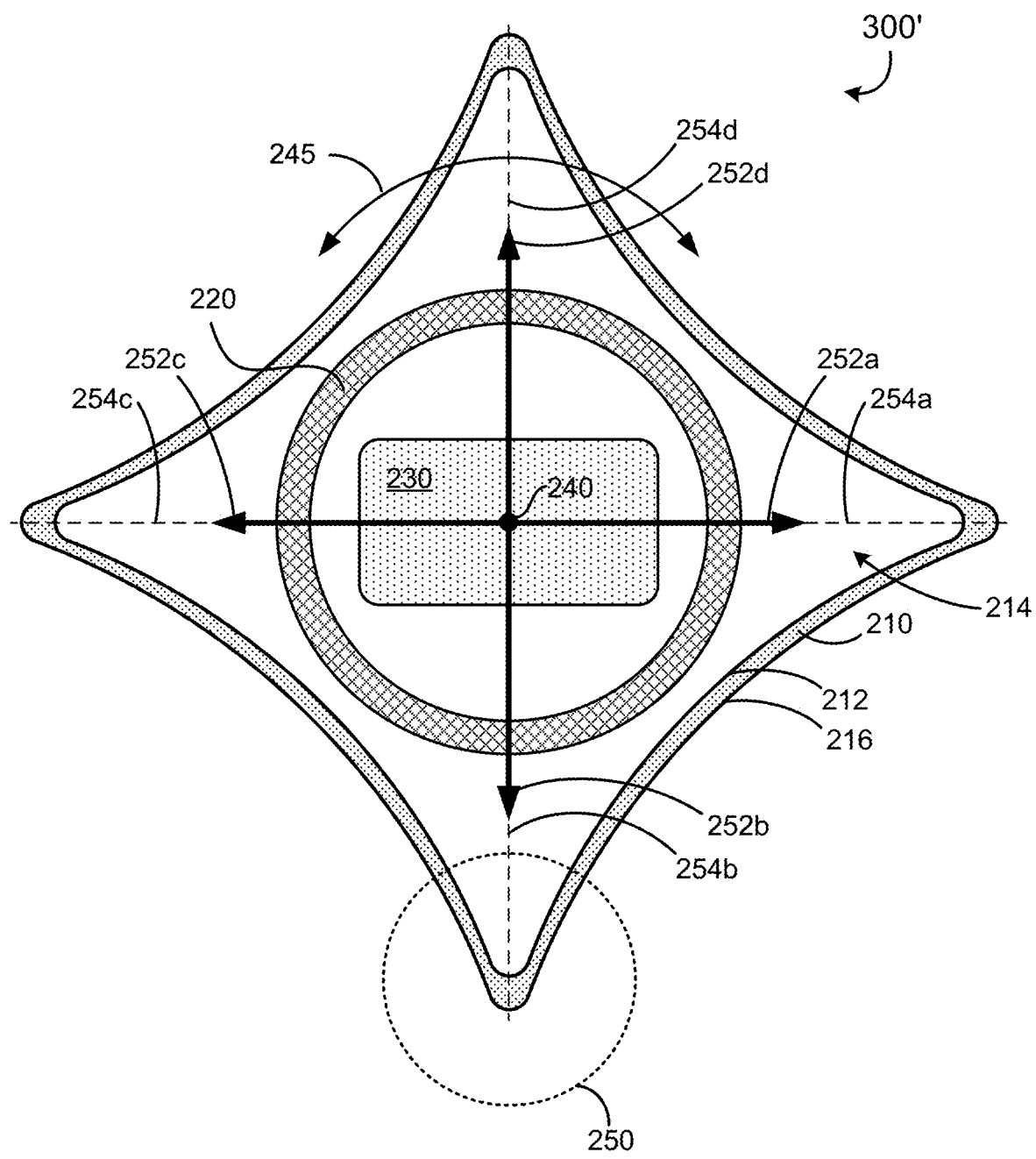
FIG. 3B shows an example cross-sectional view of an illustrative variant of the tower-mountable base station antenna enclosure system of FIG. 3.

FIG. 3B shows an example cross-sectional view of an illustrative variant of the tower-mountable base station antenna enclosure system 300 of FIG. 3 (indicated as enclosure system 300'). The cross-sectional view of FIG. 3B is cut along a plane orthogonal to the rotation axis 240 and may represent a cross section of an extruded shape having a substantially constant cross-section, or the like. The cross-sectional view of FIG. 3B shows the same components as shown in FIG. 3A with the same reference designators, but the radome 210 in FIG. 3B is configured with an outer geometry 216 (and an inner geometry 212, in the illustrated embodiment) that is a variation of the outer geometry 216 shown in FIG. 3A. In particular, rather than having substantially flat sides as in FIG. 3A, the outer geometry 216 in FIG. 3B has curved sides. In particular, the illustrated embodiment shows the ides curving inward (i.e., creating substantially concave sides to the outer geometry 216). In other implementations, one or more sides can be curved outward (i.e., creating substantially convex sides to the outer geometry 216), and/or in any suitable manner. It can be seen that operation of enclosure system 300' is substantially the same as that of enclosure system 300. In both variants, the outer geometry 216 has four vertices, each forming one of four wind deflection structures 250, thereby defining four wind alignment directions 252 (collinear with corresponding lines of symmetry 254). As a primary direction of the wind changes, the radome 210 can rotate via the rotatable coupling 220 to maintain alignment between the present prevalent wind direction and whichever of the wind alignment directions 252 is closest to that present prevalent wind direction.

Figure 4:
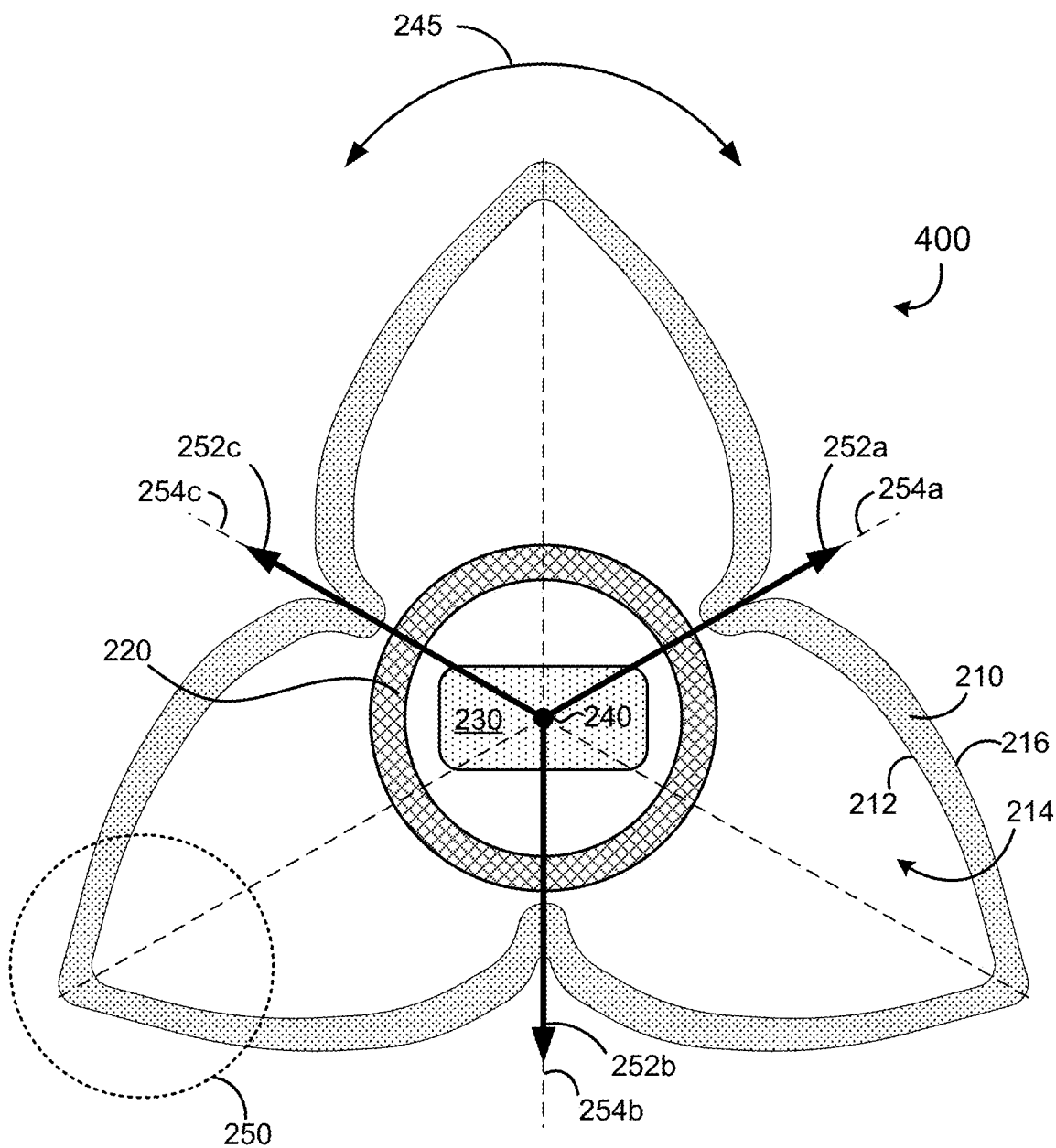
FIG. 4 shows an example cross-sectional view of another illustrative tower-mountable base station antenna enclosure system having an outer geometry that follows a multifoil shape, according to various embodiments.

FIG. 4 shows an example cross-sectional view of another illustrative tower-mountable base station antenna enclosure system 400 having an outer geometry 216 that follows a multifoil shape, according to various embodiments. As in preceding embodiments, the enclosure system 400 can rotate in an unlimited fashion around a rotation axis 240 in a clockwise and/or counter-clockwise direction (as indicated by bidirectional arrow 245). The cross-section is cut along a plane orthogonal to the rotation axis 240. In some embodiments, the cross-sectional view can represents a cross-section of a constant cross-section shape, such as cross-section through a lateral surface of an extruded shape having the illustrated cross-section. The cross-sectional view shows the same components as shown in preceding figures with the same reference designators.

Unlike the embodiments of FIGS. 2A-3B, the radome 210 in FIG. 4 is configured with an outer geometry 216 (and an inner geometry 212, in the illustrated embodiment) that follows a multifoil. In particular, the illustrated shape is similar to a trefoil, having three lobes of substantially the same shape. As a three-lobed implementation, the illustrated radome 210 can operate in a similar manner to that of the triangular embodiments described with reference to FIGS. 2A-2C. For example, the three-lobed multifoil defines three wind alignment directions corresponding to the three lobes. In the case of an outer geometry 216 that follows any N-lobed multifoil, the N lobes define N corresponding wind alignment directions. In some implementations, each lobe is shaped as an airfoil. In other implementations, each lobe is shaped as a rounded diamond. In other implementations, each lobe is shaped as a fin or wing. Each lobe can be any suitable shape, as long as other constraints of the radome 210 are met. For example, as described above, the inner geometry 212 defines a cavity 214 large enough to house one or more antenna components 230 (and supporting structures and components) in a fixed location regardless of the present rotational orientation of the radome 210, and the wind deflection structures 250 of the outer geometry 216 cause the radome 210 to rotate according to corresponding wind alignment vectors responsive to wind forces.

FIGS. 5A-5D show example perspective views 500a-500c and cross-sectional view 500d, respectively, of another illustrative tower-mountable base station antenna enclosure system 500 having an outer geometry 216 that follows a vertical helix shape, according to various embodiments. Turning first to the perspective view 500a in FIG. 5A, the enclosure system 500 includes a radome 210 and a rotatable coupling 220, similar to embodiments described above. The radome 210 is generally sized to be able to house one or more antenna components 230. The vertical helix shape of the radome 210 is formed by one or more helical blades 510 that act as multiple wind deflection structures to define multiple wind alignment directions. The helical blades 510 can deflects wind around housed antenna components 230 according to the multiple wind alignment directions by pivoting around the housed antenna components 230 using the rotatable coupling 220.

As in embodiments described above, the rotatable coupling 220 attaches the radome 210 to a tower support structure 205 to permit the radome 210 to rotate around a rotation axis 240 that is orthogonal to the wind alignment directions defined by the radome 210 structure. In the illustrated deployment of FIG. 5A, the rotatable coupling 220 includes an upper rotatable coupling 220a and a lower rotatable coupling 220b to support the radome 210 from the top and bottom.

Figure 5A:
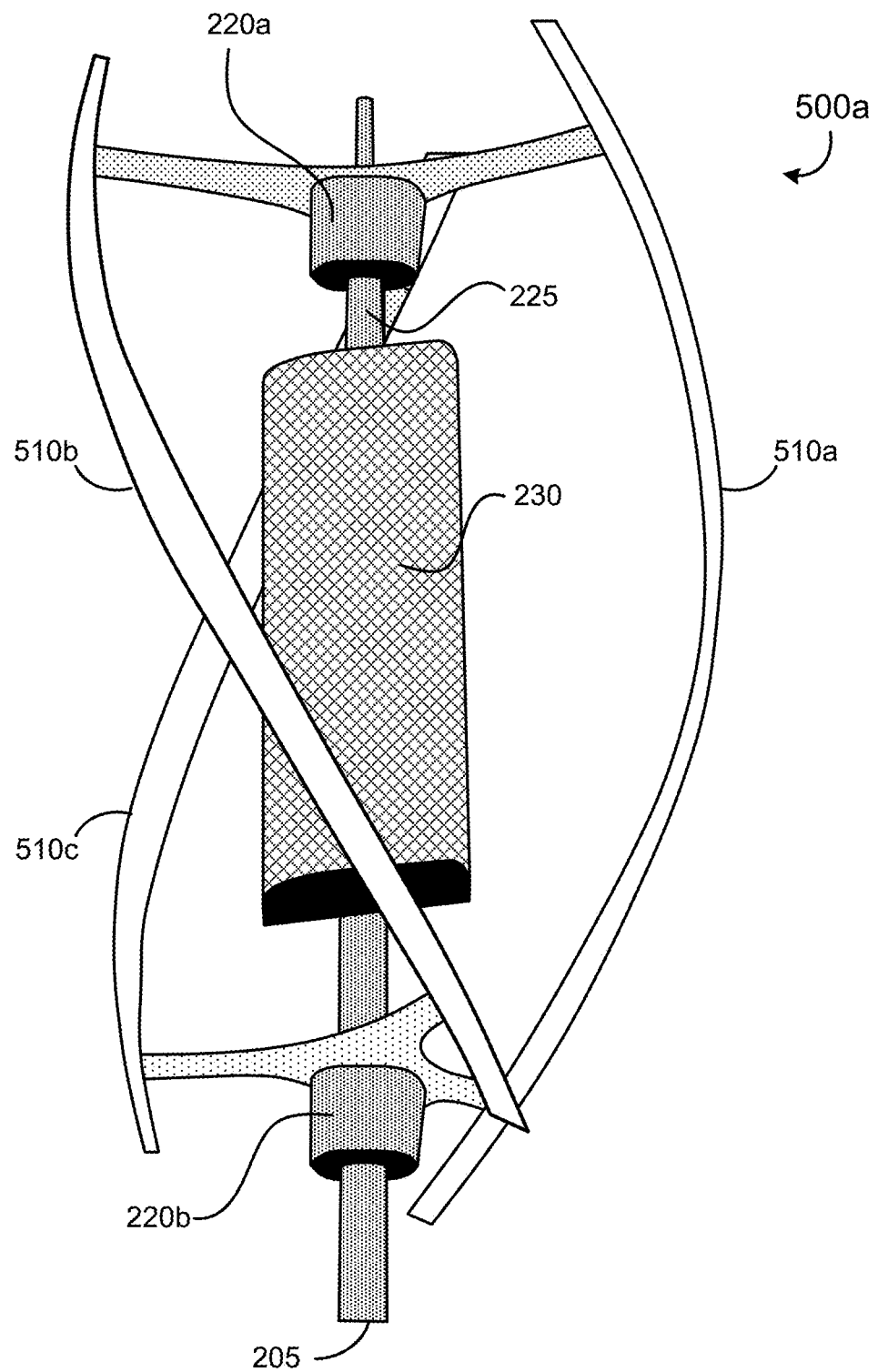
FIGS. 5A-5D show example perspective views and a cross-sectional view, respectively, of another illustrative tower-mountable base station antenna enclosure system having an outer geometry that follows a vertical helix shape, according to various embodiments.
Figure 5B:
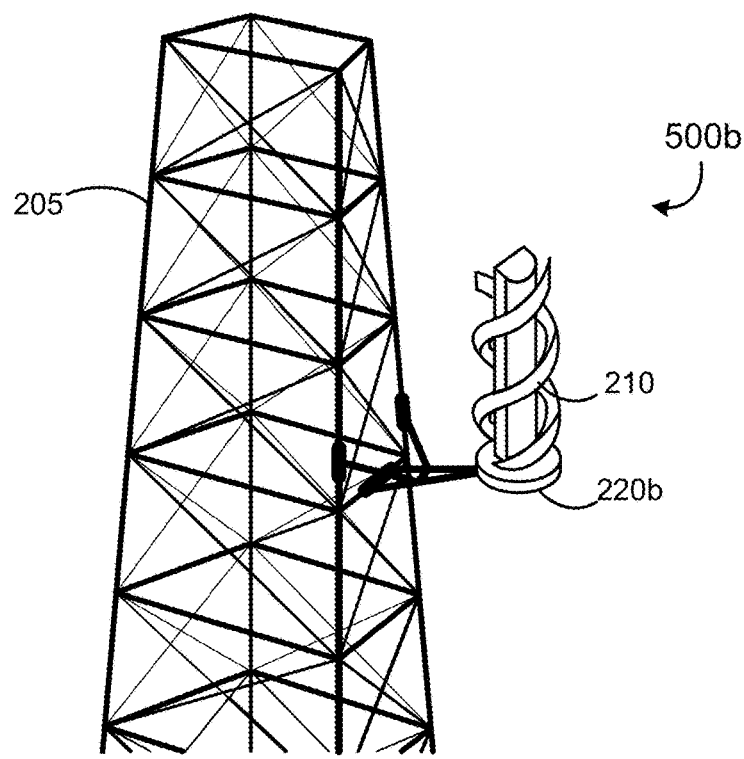
Figure 5C:
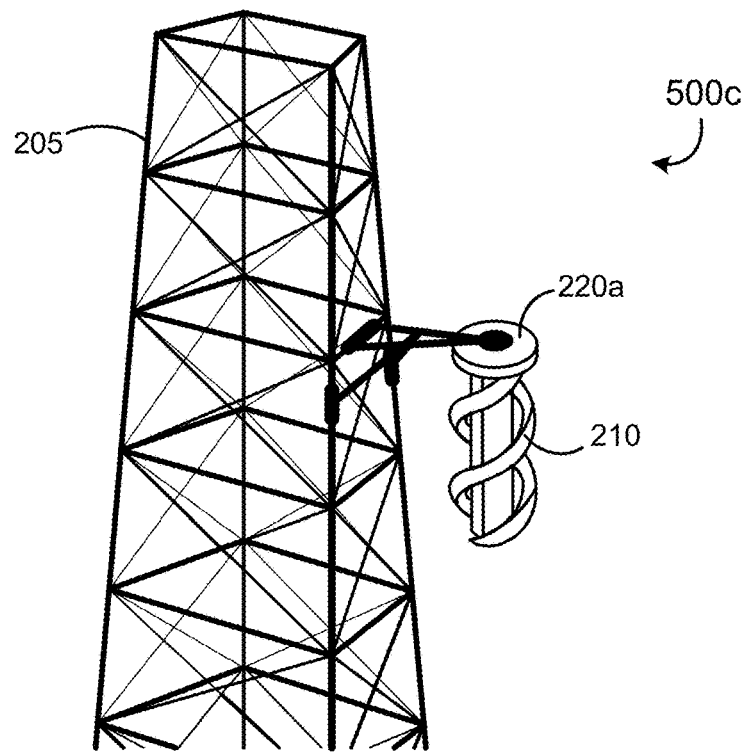

FIGS. 5B and 5C show other perspective views 500b and 500c to represent example installations of the tower-mountable base station antenna enclosure system 500. In the example installation shown in FIG. 5B, only a lower rotatable coupling 220b is used to couple the enclosure assembly with the tower structure 205. As such, the radome 210 is supported only from the bottom. In the example installation shown in FIG. 5C, only an upper rotatable coupling 220a is used to couple the enclosure assembly with the tower structure 205. As such, the radome 210 is supported only from the top. Other types of installations, coupling, etc. are possible.

In some implementations, the upper rotatable coupling 220a and/or the lower rotatable coupling 220b are coupled with a central pivot structure 225 (e.g., a pole or some other form of support), and the rotatable coupling 220 permits the radome 210 to pivot around the central structure 225. For example, a bearing assembly or some other form of rotatable coupling 220 may be used to attach the helical blades 510 of the radome 210 to the central structure 225. As the radome 210 turns to align with the wind, the antenna components 230 can remain in a fixed rotational position. For example, rotatable coupling 220 includes a fixed attachment to the tower support structure 205, a fixed attachment to the central structure 225, and a rotatable attachment to the radome 210; and the antenna components 230 are mounted by a fixed attachment to the central structure 225. As such, the antenna components 230 are coupled with the tower support structure 205 via a fixed attachment to the central structure, which has a fixed attachment to the rotatable coupling 220, which has a fixed attachment to the tower support structure 205; while the rotatable portion of the rotatable coupling 220 permits the radome 210 to rotate around the fixed position of the antenna components 230.

Figure 5D:
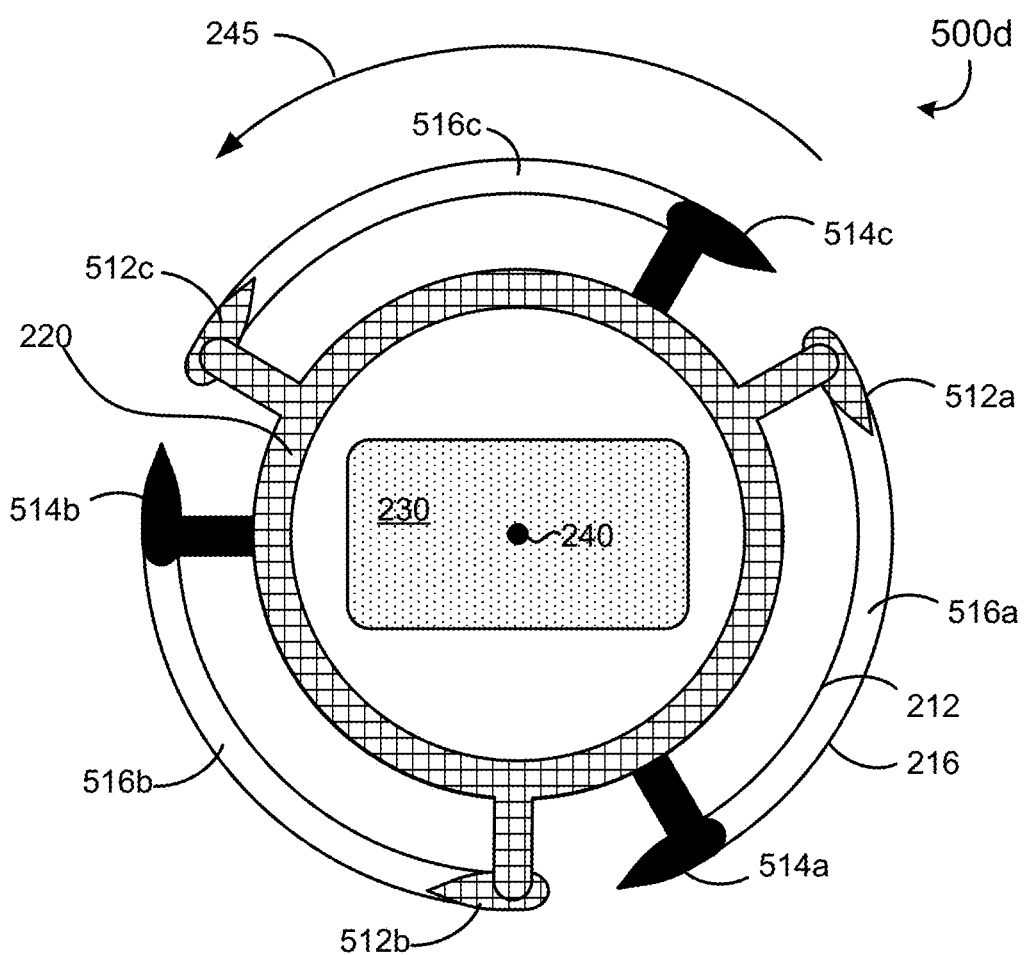

FIG. 5D shows a cross-sectional view 500d that represents information from multiple cut planes orthogonal to the rotation axis 240. In particular, each helical blade 510 is represented by an upper blade cross section 512 coupled with an upper rotatable coupling 220a (all in a cross-hatched shading), a lower blade cross-section 514 coupled with a lower rotatable coupling 220b (all in black), and a blade trace 516 representing the general area consumed by the remainder of the helical blade 510 between the upper blade cross section 512 and the lower blade cross-section 514. For example, when the top of helical blade 510a is located in the position of upper blade cross section 512a, rest of helical blade 510a extends along path 516a until the bottom of the helical blade 510a, which is located in the position of lower blade cross section 514a. The outer geometry 216 and the inner geometry 212 of the radome 210 can be defined by the outer and inner boundaries, respectively, of the blade traces 516. Thus, the outer geometry 216 is not a continuous surface having a continuous shape.

In the illustrated implementation, the cross-sectional shape of each helical blade 510 is an airfoil shape. In response to a lateral wind force, such an airfoil shape can cause the radome 210 to tend to rotate only (or primarily) in a clockwise or counter-clockwise direction (as indicated by arrow 245). The illustrated implementation includes three such helical blades 510. Other embodiments can be implemented using one or more helical blades 510 of any suitable cross sectional shape, as long as other constraints of the radome 210 are met. For example, as described above, the inner geometry 212 defines a cavity 214 large enough to house one or more antenna components 230 (and supporting structures and components) in a fixed location regardless of the present rotational orientation of the radome 210, and the wind deflection structures 250 of the outer geometry 216 cause the radome 210 to rotate according to corresponding wind alignment vectors responsive to wind forces.

As noted above, embodiments of the radome 210 formed by helical blades 510, or the like, have a discontinuous outer geometry (or inner geometry). A feature of such a discontinuous design is that, in addition to deflecting some of the wind away from the tower and thereby reducing the effective wind load of the housed antenna components 230, such a radome 510 can permit airflow to and/or from the housed antenna components 230. For example, antenna components 230 can generate heat during operation. In a fully enclosing radome 510, the heat may exceed a threshold level at which antenna components 230 can become damaged. By allowing airflow through the radome 210, hot air generated by the antenna components 230 can be permitted to leave the radome 210 to help cool the antenna components 230, and/or cooler air can be permitted to enter the radome 210 help cool the antenna components 230.

Various techniques can be used to provide such airflow features to other embodiments, such as those described with reference to FIGS. 2A-4. FIGS. 6A-6E show five examples of tower-mountable base station antenna enclosure systems 600 that include venting, according to various embodiments described herein. While the illustrated enclosure systems 600 apply particular venting strategies to particular radome 210 designs, it will be appreciated by those of skill in the art that the described venting approaches are intended to illustrate only some of many different approaches, and that these and other venting strategies can be applied to other radome 210 designs.

In many embodiments of tower-mountable base station antenna enclosure systems, including those described herein, the outer geometry 216 of the radome 210 can generally be described as having a lower base, an upper base, and a lateral surface. For example, some outer geometries 216 generally follow a prism shape, or an extrusion, such that the lateral surface has a substantially common cross-section. In some embodiments, the upper and/or lower base is fully or partially open (e.g., one or both ends of the prism, or other extruded shape is not capped). In such embodiments, heat generated by housed antenna components 230 can be permitted to escape through the open upper and/or lower base. In some embodiments, the lateral surface itself is interrupted by one or more vents. In such embodiments, the one or more vents can permit entry of air into the cavity 214 formed by the inner geometry 212 of the radome 210, when the radome is pointed along whichever of the wind alignment directions is closest to the prevailing wind vector. In some such embodiments, at least one vent corresponds to each wind alignment direction of the radome 210 design, such that, when the radome 210 is aligned according to any particular wind alignment direction, wind enters the cavity through the at least one corresponding vent. Any such vents in the lateral surface of the radome 210 can also permit heated air (e.g., generated by the antenna components 230 and/or heated by the antenna components 230) to escape from the cavity 214, and/or permit air to flow through the cavity 214 and around the antenna components 230.

Figure 6A:
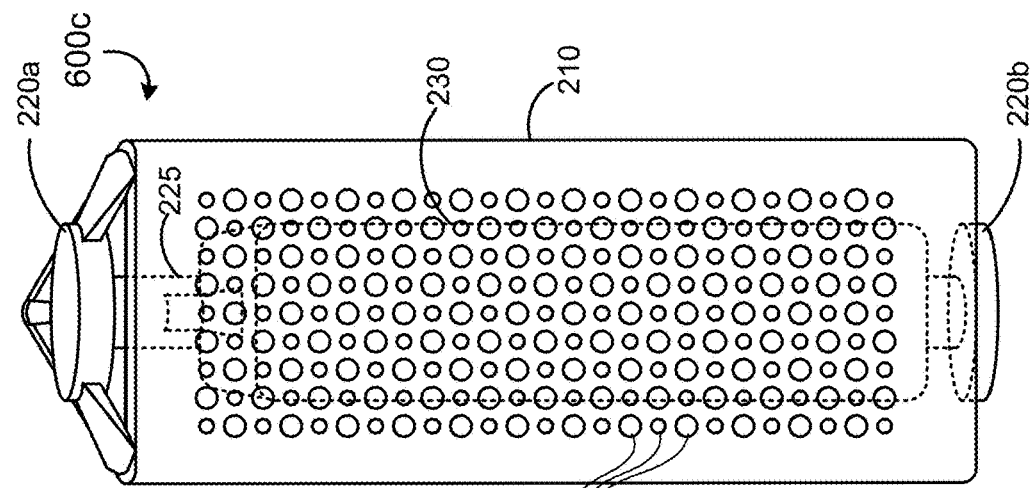
FIGS. 6A-6E show five examples of tower-mountable base station antenna enclosure systems that include venting, according to various embodiments described herein.
Figure 6B:
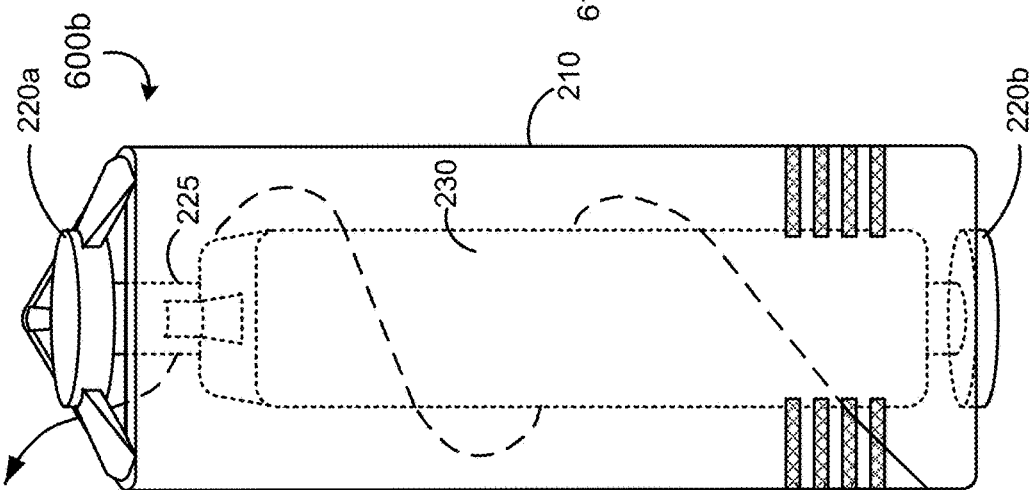
Figure 6C:
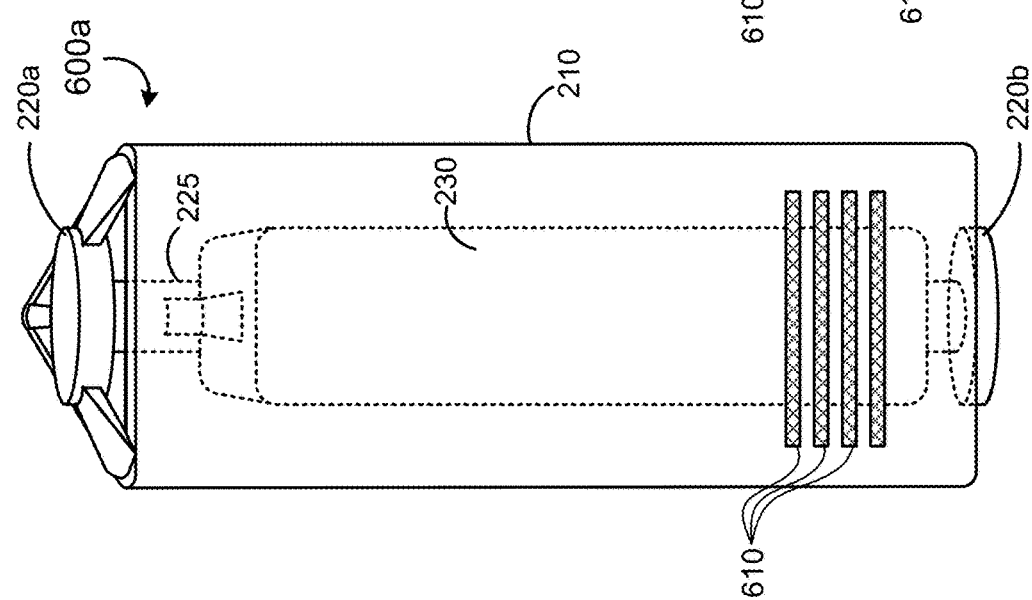

Turning to FIGS. 6A-6C, vent configurations are shown in context of an enclosure system similar to that in FIGS. 2A and 2B. In each configuration, vents 610 are integrated with one or more faces and/or vertices of the lateral surface of the radome 210. Each vent 610 includes an opening that penetrates through the outer geometry 216 and the inner geometry 212 of the face of the radome 210 structure. In FIG. 6A, the vents 610 are illustrated as horizontal cutouts in each face of the lateral surface (only one face can be seen in the illustrated orientation) of the radome 210 structure. In FIG. 6B, the vents 610 are similar to those in FIG. 6A, except that the vents 610 are illustrated as horizontal cutouts in each vertex of the lateral surface (only partial vents 610 on two of the vertices can be seen in the illustrated orientation) of the radome 210 structure. Though illustrated as simple cutouts, the illustrated vents 610 can be implemented with any suitable shape, size, and/or orientation; any suitable number of cutout can be implemented; and each vent 610 can include additional features, such as louvres, screens, etc. In some implementations, such vents include directional fins that help direct air. In FIG. 6C, the vents 610 are implemented as an array of holes in each face and/or vertex of the lateral surface (only one face can be seen in the illustrated orientation) of the radome 210 structure. For example, some or all of the radome structure can be made of a perforated material. In such implementations, the various holes can be of any shape or shapes, any size or sizes, and in any arrangement.

For added clarity, FIG. 6B illustrates air entering the vents 610 in one of the vertices of the radome 210 along a path 615. For example, the air can be wind, and the origin of the path 615 can correspond to a primary wind direction, or the like. As the air enters the cavity of the radome 210 through the vents 610, the air can generally flow around the housed antenna components 230. As described above, this can provide cooling airflow to the antenna components 230 and can help facilitate evacuation of heated air in the cavity (i.e., heated by the antenna components 230, by exposure to sunlight, etc.). Ultimately, the air can leave the cavity via any opening or openings, such as through an open upper base (as illustrated), an open lower base, another vent 610, etc.

Figure 6E:
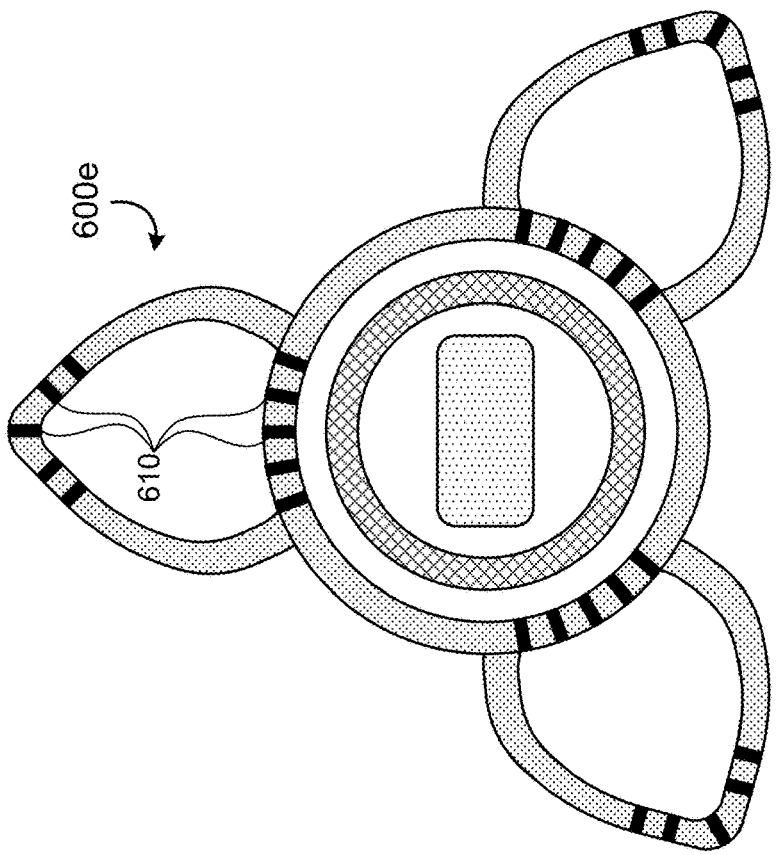
Figure 6D:
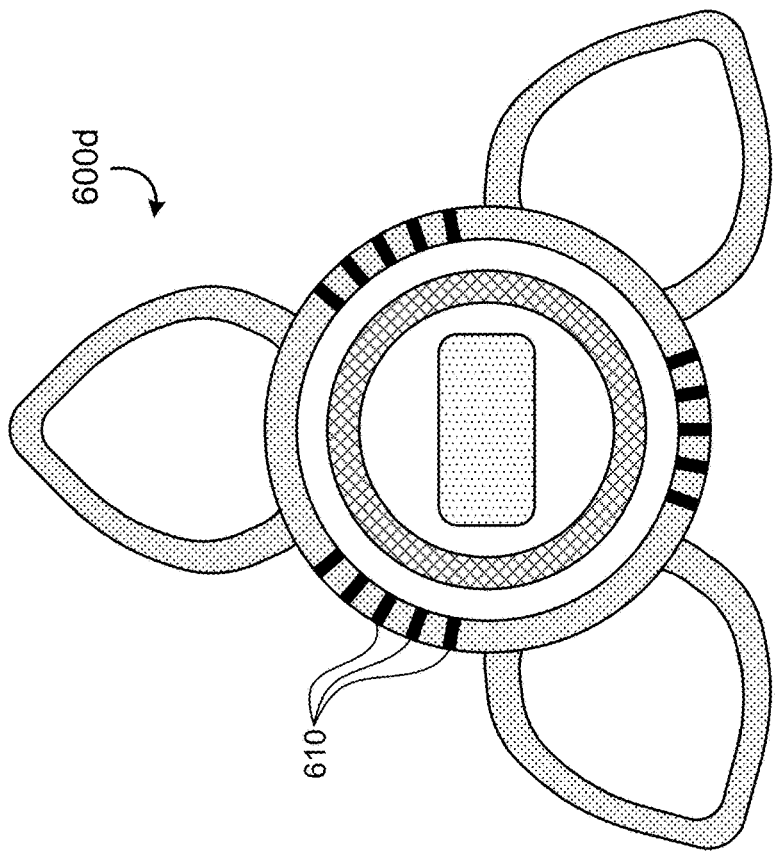

Turning to FIGS. 6D and 6E, vent configurations are shown in context of a multifoil type of enclosure system similar to that of FIG. 4. In each configuration, vents 610 are integrated with one or more features of the lateral surface of the radome 210. As described with reference to FIGS. 6A-6C, each vent 610 can be implemented with any suitable shape, size, and/or orientation of opening that penetrates through the outer geometry 216 and the inner geometry 212 of the face of the radome 210 structure; and any suitable number of vents 610 can be implemented. In FIG. 6D, the vents 610 are implemented in a portion of the radome 210 geometry between the lobes. For example, in such a configuration, some of the air from wind directed at the tip of one of the lobes can flow around the lobe and enter the cavity through the vents 610 on either side of the lobe. In FIG. 6E, the vents 610 are implemented on the lobes of the radome 210 geometry. For example, in such a configuration, some of the air from wind directed at the tip of one of the lobes can flow directly into the lobe vents 610 and into the cavity (e.g., through additional vents 610, if needed).

Additional implementations of tower-mountable base station antenna enclosure systems are possible without departing from the scope of described embodiments. For example, while some implementations are generally illustrated and described above in context of a vertical mounting (i.e., the rotatable coupling 220 couples with the top and/or bottom of the radome 210 oriented vertically when installed on a tower structure 120), other implementations can provide for horizontal mounting. In such horizontal mounting implementations, the terms "top" and "bottom" refer to radially further from the tower structure 120 and radially closer to the tower structure 120. In such implementations, a primary rotation axis 240 can still be oriented from "bottom" to "top," and there may be one or more secondary rotation axes. For example, such a tower-mountable base station antenna enclosure system can be configured to rotate into the wind along a secondary rotation axis (e.g., similar to a weather vane, or the like), and the rotatable coupling 220 then permits the radome 210 to pivot (e.g., in a corkscrew-like fashion) around the primary rotation axis 240 responsive to the transverse wind force.

Further, while various embodiments are described above in context of a single enclosure system housing a single set of antenna components 230 (e.g., mounted to a single mounting location on a tower structure 205), it will be appreciated that many practical contexts can include multiple antenna deployments in close proximity to each other on a single tower structure 205 (e.g., on adjacent mounting locations). As such, some embodiments of the enclosure system are configured to reduce total wind load across such multiple deployments. For example, if multiple antennas are deployed in close proximity on a tower structure 205, air flow currents (e.g., eddies, etc.) produced by the radome 210 of one enclosure system (housing one set of antenna components 230) may tend to impact the wind load of one or more nearby sets of antenna components 230. In some such contexts, the radome 210 geometries, rotation axes 240, vents 610, and/or other features can be designed to mitigate impact of one enclosure system on the wind load of another antenna deployment not housed by that enclosure system. For example, a single radome 210 can be designed to deflect wind around multiple antenna deployments, including ones not housed by the radome 210. In other such contexts, the radome 210 geometries, rotation axes 240, vents 610, and/or other features can be designed to operate collectively to reduce win load across multiple antenna deployments, such as by producing an aggregate wind load reduction effect.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A tower-mountable base station antenna enclosure system, comprising:
   a radome having:
      an inner geometry that defines a cavity for housing a base station antenna; and
      an outer geometry comprising a plurality of wind deflection structures that define a plurality of wind alignment directions; and
   a rotatable coupling that attaches the radome to a tower support structure to permit the radome to rotate around a rotation axis in response to a wind force along a prevailing wind vector to point the radome along whichever of the wind alignment directions is closest to the prevailing wind vector, the rotation axis defined by the rotatable coupling and orthogonal to the plurality of wind alignment directions.

2. The system of claim 1, wherein the rotatable coupling allows the radome to rotate an unlimited amount clockwise and counterclockwise around the rotation axis.

3. The system of claim 1, wherein the rotatable coupling comprises:
   a fixed structure to provide a fixed coupling between the base station antenna and the tower support structure; and
   a rotating attachment to rotatably couple the fixed structure with the radome.

4. The system of claim 1, wherein a cross-section of the outer geometry, cut along a plane orthogonal to the rotation axis, has at least two lines of symmetry, each of the wind alignment directions being collinear with one of the lines of symmetry.

5. The system of claim 4, wherein the cross-section of the outer geometry follows a rounded triangle that defines the plurality of wind alignment directions as three wind alignment directions corresponding to three vertices of the rounded triangle.

6. The system of claim 4, wherein the cross-section of the outer geometry follows a rounded quadrilateral that defines the plurality of wind alignment directions as four wind alignment directions corresponding to four vertices of the rounded quadrilateral.

7. The system of claim 4, wherein the cross-section of the outer geometry follows a rounded regular polygon of N vertices that defines the plurality of wind alignment directions as N wind alignment directions corresponding to the N vertices of the rounded regular polygon, N being an integer greater than 2.

8. The system of claim 4, wherein the cross-section of the outer geometry follows a multifoil that defines the plurality of wind alignment directions each to correspond to a respective one of a plurality of foils of the multifoil.

9. The system of claim 8, wherein each of the plurality of foils has an airfoil shape.

10. The system of claim 1, wherein:
    the outer geometry follows a vertical helix shape;
    the plurality of wind deflection structures comprises helical blades; and
    a cross-section of the outer geometry, cut through the helical blades along a plane orthogonal to the rotation axis, defines the plurality of wind alignment directions at the plane.

11. The system of claim 1, wherein the outer geometry has a substantially constant cross section along the rotation axis.

12. The system of claim 1, wherein the outer geometry is defined by a lower base, an upper base, and lateral surface interrupted by a vent that permits entry, into the cavity, of air traveling at least along the prevailing wind vector with the radome pointed along whichever of the wind alignment directions is closest to the prevailing wind vector.

13. The system of claim 12, wherein the vent is one of N vents, each associated with one of N wind alignment directions to permit entry, into the cavity, of air traveling at least along the prevailing wind vector with the radome pointed along the associated one of the N wind alignment directions, N being an integer greater than 1.

14. The system of claim 12, wherein at least a portion of the radome is made of a perforated material that forms the vent.

15. The system of claim 12, wherein:
    the vent is a lateral vent;
    at least one of the lower base or the upper base comprises a base vent to permit exit of the air from the cavity; and
    the lateral vent and the base vent jointly permit convection air flow through the cavity.

16. The system of claim 1, wherein the outer geometry is defined by a lower base, an upper base, and an uninterrupted lateral surface.

17. The system of claim 1, wherein the outer geometry has a lateral surface that is at least partially covered in drag-reducing features.

18. The system of claim 1, wherein the cavity defined by the inner geometry is sized to house multiple base station cellular antennas.

19. The system of claim 1, wherein the cavity defined by the inner geometry is sized to house a radio unit.

* * * * *